United States Patent Office 3,814,618
Patented June 4, 1974

3,814,618
PRODUCTION OF COLORED COATED
GLASS FIBERS
Robert F. Kimpel, Azusa, and Albert Lewis, Covina, Calif., assignors to Kaiser Glass Fiber Corporation, Oakland, Calif.
No Drawing. Filed Oct. 15, 1971, Ser. No. 189,721
Int. Cl. C03c 25/00; D06p 3/80
U.S. Cl. 117—61                              9 Claims

ABSTRACT OF THE DISCLOSURE

Glass fibers coated with polyvinyl acetate are colored by treating such fibers in package form with an aqueous dye solution and involves a method wherein the package is placed in a container and subjected to a vacuum. The dye solution is added, and then pressure is applied to obtain the desired depth of color. A small amount of polyvinyl alcohol is incorporated in the dye solution. The glass package is separated from the dye solution and dried.

BACKGROUND OF THE INVENTION

This invention relates to a colored, coated glass filament and to a method of producing the same. More particularly, the invention concerns a polyvinyl acetate-coated glass filament colored with a red dye and useful as a tracer fiber and a method of making such a product by treating a polyvinyl acetate-coated glass filament with an aqueous dye solution.

It has been proposed in the prior art to coat or size glass fibers and filaments with starch or gelatin and to thereafter dye such coated fibers in package form with a solution of a dye in an organic solvent in order to obtain good penetration of the dye into the package of fibers and to effect uniform coloration. It has also been previously proposed to apply a polymeric coating on siliceous material such as glass in the presence of certain halogen-silicon compounds or of a metal carbonyl such as chromium carbonyl, and with the aid of an organic solvent; and thereafter to dye the coated glass sheet or fiber, e.g. by immersion in an aqueous dispersion of the dye. Examples of such prior art practice are discussed in U.S. Pats. 2,900,275, 3,560,254, 3,261,736 and 3,384,505. However, it is still desired in this art to provide a method of dyeing glass fibers coated with a resin by use of an aqueous dye medium and without the necessity for the presence of organic solvents which have substantial volatility at the temperature of operation and to provide such a method useful for coloring glass fiber packages with good dye penetration and uniform coloring.

In the method according to the present invention, the glass fiber package is colored by immersion in a substantially aqueous dye solution in the manner described herein, the process being carried out at ambient temperature. The packages are thoroughly impregnated with the color and the coated glass filaments are uniformly stained or colored. These objects are attained by treating the glass packages in a substantially aqueous medium, which is less costly than treatment with nonaqueous organic solvents. It has further advantages over the use of readily volatilizable organic solvents in that quality control is easier and less costly, an expensive inventory of such solvents need not be stored, and health and safety hazards are avoided.

SUMMARY OF THE INVENTION

The invention concerns the production of a colored coated glass fiber wherein the glass filament or fiber which is coated with polyvinyl acetate is dyed while in a packaged state by means of a suitable dye dissolved in water. The method of production particularly includes the steps of placing the glass package in a treatment zone, reducing the pressure in such zone to evacuate the air spaces in such package, introducing the desired aqueous dye solution containing a small amount of polyvinyl alcohol; and then pressurizing to effect coloration of the filaments or fibers.

The glass fibers are coated with polyvinyl acetate size or binder, using a chromium compound, especially in the form of a Werner complex, to effect good coating. These coated fibers are formed into strands with the aid of such size or binder, in the conventional manner, and are wound onto a support such as a tube to form a package. The package is then subjected to dyeing.

In the dyeing method according to the present invention, the glass fiber package is placed in a treatment zone which is a vessel or container which can be sealed and subjected alternately to vacuum and pressure by means of suitable conventional fittings, pumps, etc. The vessel is closed tightly and the treatment zone is subjected to vacuum to evacuate air or gases from the interstices of the glass package. Suitably, there is pulled a vacuum of at least about 20 inches, and advantageously of about 28 inches, of water.

Thereafter, while vacuum is maintained, an aqueous solution of the desired dye is admitted to the treatment zone to cover the glass package. Then the vacuum is broken and the zone brought to atmospheric pressure, and the pressure is then increased to at least about 25 p.s.i.g. and is maintained at this value for at least about 5 minutes. Higher pressure can be used, e.g., up to the pressure capacity of the equipment employed, but in general a pressure of more than about 35 p.s.i.g. is not economical or necessary. Likewise, the time during which such pressure is applied can be increased such as from 5 to 15 minutes but is not generally necessary or economical. Although the time and pressure are primarily selected according to the depth and uniformity of color to be obtained, it is to be understood the pressure or time or both can be varied, depending upon tightness of winding of the cake of glass, its greater dryness before dyeing and the capillary structure of the cake. However, for a standard glass package of about ¾ inch thickness, the pressure of 25 p.s.i.g. for 8 to 10 minutes is effective to give satisfactory coloration of the strands or fibers of coated glass.

At the end of the dyeing pressure stage, the pressure is reduced to atmospheric and the vessel is drained, with recovery of the remaining dye solution. The package is removed from the treatment zone and heated to dry at a suitable temperature, e.g., at from 210° to 230° F.

The dye solution is a solution of any desired and suitable dye in water containing from about 1% to about 3% polyvinyl alcohol.

In a preferred method of preparing the dye solution, the polyvinyl alcohol is dissolved in a minor amount of the total water, this portion of water being heated to facilitate solution. Then the alcohol-water solution and aqueous stock base dye solution are admixed to form the dye solution for adding to the treatment zone.

The colored glass fibers or strands prepared as described herein are useful for many purposes, and especially are useful as tracers, i.e., for indicating depth of glass applied in fiberglass construction such as a boat hull or other. For tracer use, red-colored fibers are preferred and a dye known as Fast Wool Red, GL, is especially useful for glass fibers for such purposes.

DETAILED DESCRIPTION OF THE INVENTION

The invention will be described with reference to a glass cake or package of about ¾ inch thickness of assembled glass fibers, which have a coating or size or binder of polyvinyl acetate affixed with the aid of Werner chrome complex, and which are to be dyed with Fast Wool Red, GL, conc. 150% dye, a material available in commerce. The glass package is tubular in shape, being wound on a mandrel support or tube, weighs about 8–9 lbs., and is about 30 inches in outside circumference. The internal diameter surface layer of the package is removed by suitable means before dyeing.

The dyeing operation is initiated by placing the glass package in a vacuum pot, and a vacuum of 28 inches of water is applied and held for several minutes, or until the pot is fully evacuated. A dye solution is prepared by dissolving 190 grams of the above dye in powder form in 1.0 gallon (3.780 gms.) water. Conveniently, the powdered dye is first made into a paste with a small amount of the water, and then the remainder of the water is added to form a Base Dye Solution. This is then made into a working dye solution or, where as here, the glass fibers are to be used as tracers, a tracer dye solution, according to the formula:

| | Percent by weight |
|---|---|
| Water | 76.0 |
| Elvanol | 1.5 |
| Base Dye Solution | 22.5 |

The polyvinyl acetate employed to size the fibers is commercially available from the National Starch and Chemical Corporation and exhibits a pH of 4.5 in aqueous emulsion. As a dried film on glass, it exhibits a Sward Rocker Hardness of 38 and is resistant to swelling in contact with water. The Elvanol is polyvinyl alcohol as available from E. I. du Pont de Nemours & Co., is soluble in water, and is compatible with polyvinyl acetate, colorless and unaffected by light. It is believed that, due to its compatibility with the water-resistant polyvinyl aceate, the polyvinyl alcohol in some manner carries the dye into satisfactory penetration of the coating of the glass fibers.

In an advantageous method of preparing the tracer dye solution, the Elvanol is dissolved in one-fourth of the water, at a water temperature of 160–170° F., and this solution is added to the balance of the formula water at room temperature. The Base Dye Solution is then thoroughly mixed into the water-Elvanol solution.

The vacuum pot mentioned above is connected with a vessel containing the tracer dye solution by a suitable fill-line conduit controlled by a fill-line valve. Such valve is opened at the end of the evacuation step mentioned above to introduce the dye solution into the pot to completely cover the package. The process is maintained in this condition for from 5 to 15 minutes following which the fill-line valve is then closed, and the pot is vented to the atmosphere, after which the vent valve is closed.

By means of an air pump, the pressure in the pot is then increased to 25 p.s.i.g. and held there for at least 8 minutes. The fill-line valve is then opened to drain the dye solution back to its original container. When the pot has drained, the fill-line valve is closed and the vent valve thereafter opened to restore the pot to atmospheric pressure. The pot is then opened and the wet package removed and allowed to rest on its side and drain for at least 30 minutes, the operator sponging up any dye collecting on the inside bottom surface of the cake. The cake is then dried at 210°–230° F. for about 6 hours to obtain a dry cake whereof the individual fibers or filaments exhibit good and uniform depth of color.

The above specific description and example have been given for purposes of illustration only and variations and modifications can be made therein without departing from the spirit and scope of the appended claims.

Having now described the invention what is claimed is:

1. Method of producing colored coated glass fibers which comprises:
   (a) forming polyvinyl acetate-coated glass fibers into a package having air spaces therein,
   (b) placing said package in a treatment zone at ambient temperature and under reduced pressure to evacuate said air spaces,
   (c) providing an aqueous dye solution containing a small amount of polyvinyl alcohol, sufficient to effect transfer of said dye to said coated fibers,
   (d) introducing the dye solution into said zone while maintaining said reduced pressure,
   (e) increasing pressure in said zone to atmospheric pressure,
   (f) thereafter increasing pressure in said zone to at least 25 p.s.i.g. and maintaining the pressure until the desired depth of color is obtained in said fibers,
   (g) reducing pressure to atmospheric pressure in said zone, and
   (h) separately recovering and drying said package.

2. Method as in claim 1 wherein said dye is Fast Wool Red GL.

3. Method as in claim 1 wherein said treatment zone is maintained at a reduced pressure of from 20 to 28 inches of water.

4. Method as in claim 1 wherein said package is maintained at said reduced pressure for from 5 to 15 minutes.

5. Method as in claim 1 wherein there is added from 1% to 3% by weight of said alcohol.

6. Method as in claim 1 wherein said aqueous solution contains about 1.5% by weight of polyvinyl alcohol.

7. Method as in claim 1 wherein said increased pressure is from 25 to 35 p.s.i.g.

8. Method as in claim 1 wherein said increased pressure is maintained for from 5 to 15 minutes.

9. Method as in claim 1 wherein said package is dried at a temperature of from 210° to 230° F.

References Cited

UNITED STATES PATENTS

| 3,488,208 | 1/1970 | Jinnette | 117—76 T X |
| 3,384,505 | 5/1968 | Palmer et al. | 117—54 |
| 3,644,137 | 2/1972 | Fox et al. | 117—119 X |
| 3,160,896 | 12/1964 | Smith | 8—Dig. 16 |
| 2,645,553 | 7/1953 | Lawsberg | 8—8 |
| 2,722,489 | 11/1955 | Hennessey et al. | 8—8 X |

FOREIGN PATENTS

| 659,184 | 3/1963 | Canada | 117—126 GB |

RALPH HUSACK, Primary Examiner

U.S. Cl. X.R.

8—8; 117—72, 94, 119, 126 GB, 126 GQ